Sept. 10, 1968 H. V. BELL ET AL 3,401,380

ELECTRICAL SYSTEMS FOR THE RECEPTION, STORAGE, PROCESSING AND RE-TRANSMISSION OF DATA

Filed May 11, 1966 11 Sheets-Sheet 1

INVENTORS

HAMISH VERNON BELL
ORRAN TERENCE PATE
DAVID HARTLEY

BY Young & Thompson
ATTYS.

INVENTORS
HAMISH VERNON BELL
ORRAN TERENCE PATE
DAVID HARTLEY
BY Young + Thompson
ATTYS.

INVENTORS
HAMISH VERNON BELL
ORRAN TERENCE PATE
DAVID HARTLEY
BY Young & Thompson
ATTYS.

INVENTORS
HAMISH VERNON BELL
ORRAN TERENCE PATE
DAVID HARTLEY
BY Young & Thompson
ATTYS INVENTORS
HAMISH VERNON BELL
ORRAN TERENCE PATE
DAVID HARTLEY
BY Young & Thompson
ATTYS.

Sept. 10, 1968 H. V. BELL ETAL 3,401,380

ELECTRICAL SYSTEMS FOR THE RECEPTION, STORAGE, PROCESSING AND RE-TRANSMISSION OF DATA

Filed May 11, 1966 11 Sheets-Sheet 6

INVENTORS
HAMISH VERNON BELL
ORRAN TERENCE PATE
DAVID HARTLEY
BY Young & Thompson
ATTYS.

INVENTORS
HAMISH VERNON BELL
ORRAN TERENCE PATE
DAVID HARTLEY
BY Young & Thompson
ATTYS.

INVENTORS
HAMISH VERNON BELL
ORRAN TERENCE PATE
DAVID HARTLEY
BY Young & Thompson
ATTYS.

Sept. 10, 1968 H. V. BELL ETAL 3,401,380
ELECTRICAL SYSTEMS FOR THE RECEPTION, STORAGE, PROCESSING AND RE-TRANSMISSION OF DATA
Filed May 11, 1966 11 Sheets-Sheet 9

INVENTORS
HAMISH VERNON BELL
OREAN TERENCE PATE
DAVID HARTLEY
BY Young & Thompson
ATTYS.

Sept. 10, 1968 H. V. BELL ETAL 3,401,380

ELECTRICAL SYSTEMS FOR THE RECEPTION, STORAGE, PROCESSING AND RE-TRANSMISSION OF DATA

Filed May 11, 1966 11 Sheets-Sheet 10

INVENTORS
HAMISH VERNON BELL
ORRAN TERENCE PATE
DAVID HARTLEY
BY Young & Thompson
ATTYS.

INVENTORS
HAMISH VERNON BELL
ORRAN TERENCE PATE
DAVID HARTLEY
BY Young & Thompson
ATTYS.

United States Patent Office 3,401,380

Patented Sept. 10, 1968

3,401,380

ELECTRICAL SYSTEMS FOR THE RECEPTION, STORAGE, PROCESSING AND RE-TRANSMISSION OF DATA

Hamish Vernon Bell, Orran Terence Pate, and David Hartley, Liverpool, England, assignors to Automatic Telephone & Electric Company Limited Filed May 11, 1966, Ser. No. 549,241

Claims priority, application Great Britain, May 13, 1965, 20,177/65

7 Claims. (Cl. 340—172.5)

The present invention relates to electrical system for the reception, storage, processing and retransmission of data.

The invention is more particularly, although not exclusively, suited to the automatic control and routing of telegraph messages using start-stop code.

Telegraphic message transmission is performed by the transmission and reception of alpha numeric characters transmitted serially over telegraph channels or lines. Each message consists essentially of an "envelope" and a "text." In general, the "envelope" contains the control information required to route the message (the address portion), network activation signals and signals required to restore the network to rest at the termination of the message transmission. The "text" contains the message information content for the addressed party. In a system serving a multiplicity of lines or channels, the message may be routed to the required "addressed" party through one or more exchange or switching points commonly called switching centres. If a required output channel is busy the message must be stored until the output line or channel is free. Hence it is a requirement of a switching centre that it operates on a store-and-forward basis.

The operations of one signal path in such a telegraph switching system, when a message transmission is originated, adheres to a rigid time cycle. If the receiving device, or any intermediate storage equipment, does not correctly respond to the information presented in each time cycle, errors in the ultimately received information will be experienced.

Although each individual line or channel connected to the switching centre adheres to a rigid time cycle, a large centre has to cope with many lines and/or channels commencing and ceasing operation in a nonsynchronised manner. To solve these problems it has been proposed to employ a digital data processing device or computer operating on a "real-time" basis suitably programmed so that the handling of the messages are performed continuously and automatically, allowing human operators merely to initiate and terminate the operation. The systems of the prior art have concentrated on the use of a single digital computer for the handling of the operations required for message switching, causing much stress to be placed on reliability and serviceability of the electronic components therein.

It is the object of the present invention to provide a reliable high-speed automatic telegraph switching centre employing digital data processing devices for use in a telegraph network which reduces the effects caused by electronic component or system failure upon the successful and reliable handling of individual telegraph messages.

According to one aspect of the invention, an electrical system for the reception, storage, processing and retransmission of data comprises a plurality of data processing devices, and a plurality of input/output lines or channels over which the data is received and retransmitted, each of said data processing devices obeying substantially identical programmes not necessarily in synchronism and the input/output lines or channels are divided into a plurality of equal groups, the number of groups being equal to the number of data processing devices and each of said devices under "no fault" conditions serves exclusively one group of input/output lines or channels whereas under detected fault conditions in one of said devices means become effective automatically to allocate by exclusive connections the input/output lines served by the faulty device equally among the remaining non-faulty devices thereby ensuring continued equal loading of said remaining devices and continued service by the system of all said input/output lines or channels.

The various features of the invention will be more readily understood with reference to the following description of one embodiment of the invention which should be read in conjunction with the accompanying drawings. Of the drawings:

FIG. 1 shows a block diagram of one embodiment of the invention;

FIGS. 2*a* and 2*b* show detailed block diagram of parts of FIG. 1;

FIGS. 6 and 7 show the logical diagram of an output unit, while

Figure 9A:
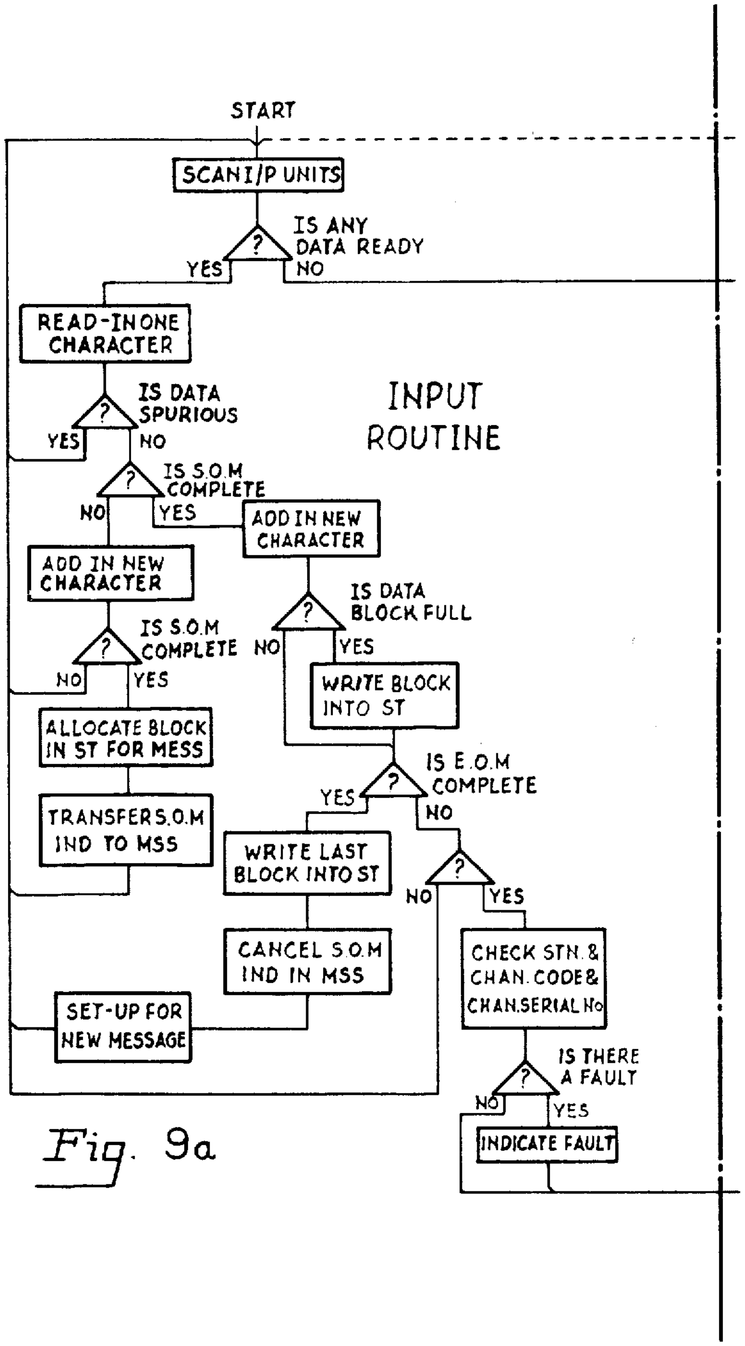
Figure 9B:
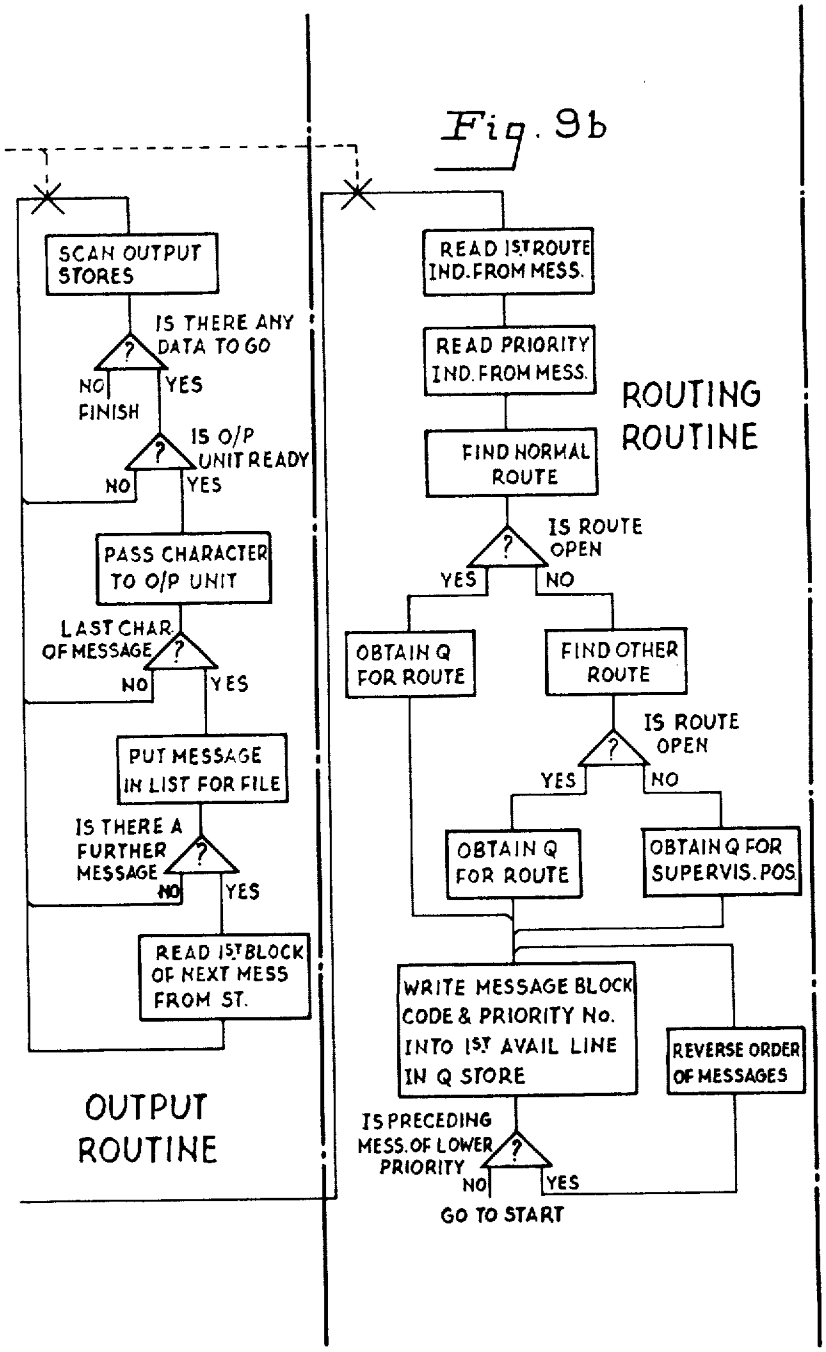

FIGS. 9*a* and 9*b* show the flow diagram of part of the programme for controlling the data processing devices.

Figure 1:
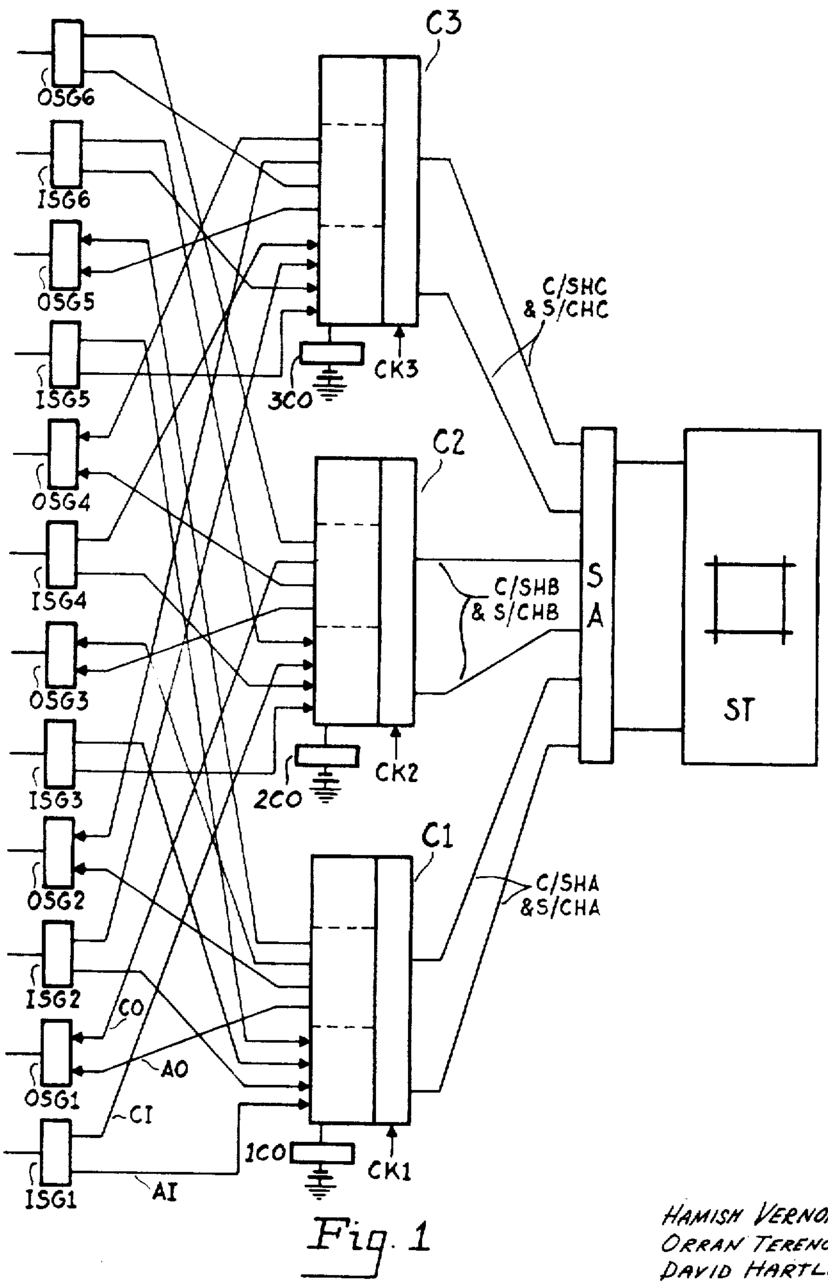

Referring firstly to FIG. 1, a description of the overall operation of the telegraph message switching centre will be given. Three data processing devices C1, C2 and C3 are shown in FIG. 1 serving a number of sub-groups of input/output equipment ISG1–6/OSG1–6. The constitution of each sub-group is identical and is shown typically in FIG. 2*a* (input-sub-group) and 2*b* (output sub-group). Basically each computer or data processing device handles incoming messages with respect to the lines or channels terminated on input units forming one group which in the case shown is divided into two sub-groups, ISG1 and ISG2 in the case of data processing device C1. The messages are processed and passed via the access equipment SA to a common store ST and a "note" is made of the output line or channel to which each received message address corresponds. When the required outgoing line or channel is free, the next message to be transmitted out of the switching centre is removed from the common store by the data processing device assigned to that line or channel and the message content is fed, a character at a time, to the relevant output unit. Each data processing device serves a group of output units which in the case chosen for explanation is divided into two sub-groups, OSG5 and OSG6 in the case of data processing device C3. If a fault occurs in any of the data processing devices C1–C3 the groups of input and output units are switched so that they are served by the other two data processing devices. The actual arrangements provided can be more easily appreciated with reference to FIGS. 2*a* and 2*b*.

Figure 2A:
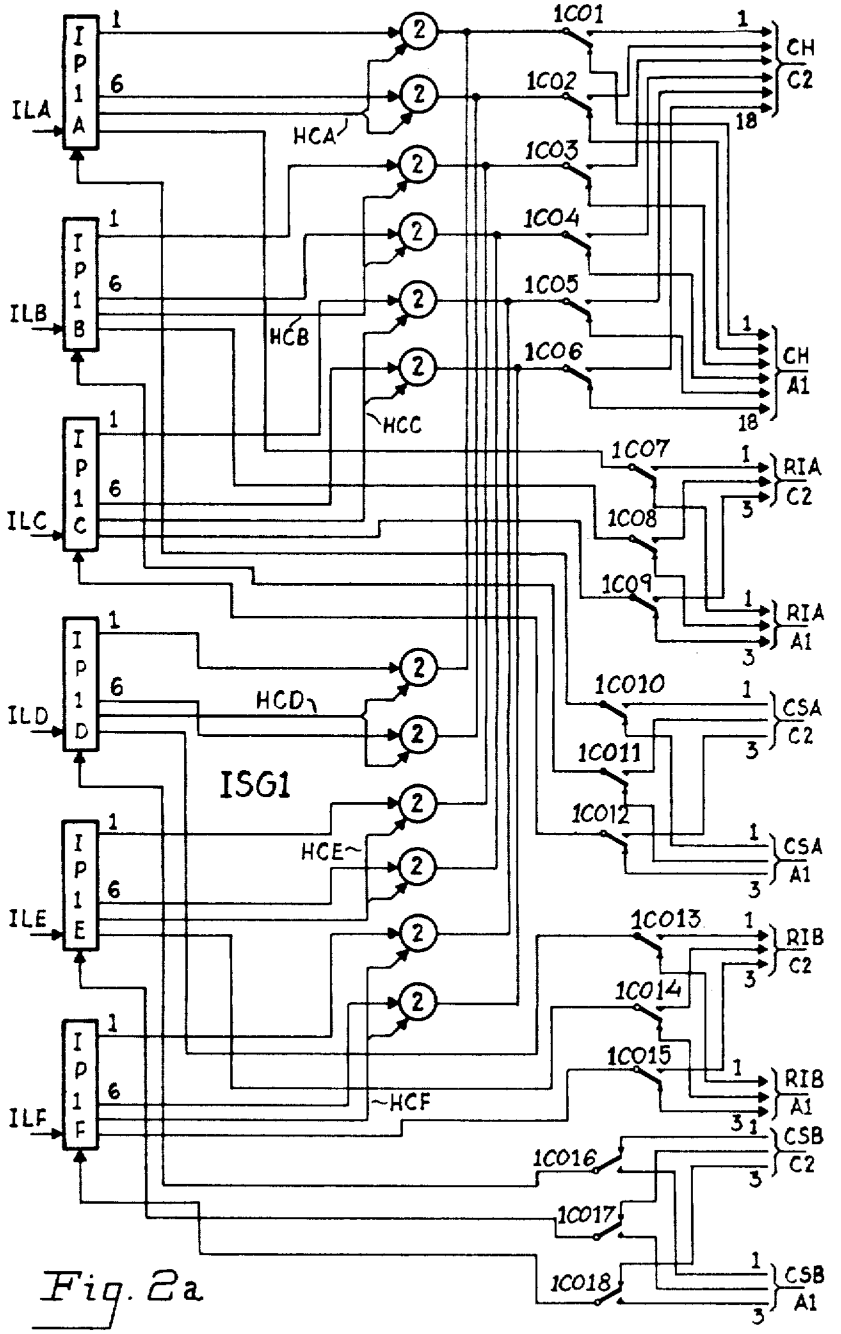

Referring firstly to FIG. 2*a* this shows a typical skeletonised block diagram of the equipment included within an input sub-group, such as that shown as ISG1 in FIG. 1. FIG. 2*a* shows six input units IP1A to IP1F each serving individually one of the incoming lines or channels ILA–F. Each input unit is identical and is shown in logical diagram form in FIGS. 3 and 4 which will be considered in detail later.

Basically each input unit consists of a seven stage shift register, used to receive the "seven-and-a-half" element telegraph code characters which are transmitted from the calling telegraph equipment in serial form, and a six stage parallel register which stores the five character indicating elements plus a parity element. The five character indicating elements plus an internally generated character parity element are passed from the shift register to the parallel register when the full seven-and-a-half element code has been received. Additionally control equipment is provided to allow exclusive access to the particular input unit by the controlling data processing device and an indication of the "readiness" of the input unit (i.e. when the five elements of a character are passed into the parallel register).

When a full character has been received and the character indicating elements passed to the parallel register in the input unit, a "ready" signal is produced by the input unit. Considering input unit IP1C in FIG. 2*a*, a signal will be produced on lead RIAA1/3. This signal is passed to the controlling data processing device which is C1 in FIG. 1 and when this device is ready to accept input information it will use this "ready" signal to cause the generation of the relevant address allocated to input unit IP1C. This address, which may be of parallel multi-bit form, is passed over lead CSAA1/3 to select the input unit IP1C. The selection of this input unit causes a signal on lead HCC to be generated allowing the gating of the six elements held in the parallel register in the input unit onto the data processing device input highway on leads CHA1/13 to CHA1/18. In FIG. 2*a* only leads 1 and 6 are shown of the six output leads from the parallel register in each input unit to simplify the configuration of this drawing. The data processing device input highway CHA1 consists of eighteen leads and therefore provision is made for the transfer of up to three sets of character indicating elements at a time. Hence if input units IP1A, IP1B and IP1C are all simultaneously producing signals on their ready leads (i.e. leads RIAA1/1, RIAA1/2 and RIAA1/3) when the controlling data processing device commences its "input routine," selection signals will be produced on all three address leads CSAA1. Gating signals will be produced on lead HCA, HCB and HCC allowing the simultaneous transfer of the three sets of character indicating elements over the computer input highway CHA1.

The input routine for each data processing device is organised in a "cyclic manner" although it need not be clock controlled and may be performed asynchronously. Each sub-group of input units is divided into equal sections of three input units per section. In the case shown in FIG. 2*a* two sections are shown (i.e. section 1 includes input units IP1A, IP1B and IP1C and section 2 includes input units IP1D, IP1E and IP1F). Hence the controlling data processing device upon entering its "input routine" looks at the ready signal leads for section 1 first and transfers in any waiting character indicating element information. Having completed this operation it looks at the ready signal leads for section 2 and so on according to the number of sections within a sub-group. Having completed the input transfer of the information for one sub-group the input routine will now control the input transfer in a similar manner for the second sub-group, such as ISG2 in FIG. 1 for data processing device C1, and so on according to the number of sub-groups handled by the device.

Referring now back to FIG. 1 it will be seen that each input unit sub-group such as ISG1 has two output paths. Each of these paths is in fact a multi-conductor arrangement consisting of the computer input line, the ready signal lead line and the address selection lead line. Thus the path marked AI is formed by those leads marked CHA1, RIAA1, RIBA1, CSAA1 and CSBA1 in FIG. 2*a*. The remaining leads (i.e. those which are disconnected when the change-over contacts shown in FIG. 2*a* are at rest) form the multi-conductor path CI in FIG. 1. Hence under normal conditions each data processing device in FIG. 1 handles two input sub-groups. It will be noted that the lower position of each data processing device in FIG. 1 has four input paths, the additional paths bieng used only if one of the other data processing devices is removed from service due to a detected fault or on routine maintenance.

Arrangements are provided such that if a fault occurs in one of the data processing devices, the information produced by the input unit sub-groups served by the faulty data processing device is directed to the remaining data processing devices. If data processing device C1 fails, the fault detection equipment of device C1 causes the energisation of relay 1CO which operates its changeover contacts 1CO1 to 1CO18 shown in FIG. 2*a* thus diverting the information and control lines for input subgroup ISG1 to the "third" input connection on device C2 over path CI (FIG. 1). Input unit sub-group ISG2 will be similarly affected and will be served by device C3. Thus the effect of a faulty data processing device as far as the input of messages is concerned is simply to extend the duration of the input routine for the other devices in the system.

From FIG. 1 it can be seen that if data processing device C1 fails, device C2 handles input sub-groups ISG3, ISG4 and ISG1 while device C3 handles input sub-groups ISG5, ISG6 and ISG2. If device C2 fails, relay 2CO operates and at its contacts enables device C1 to handle sub-groups ISG1, ISG2 and ISG3 and device C3 handles sub-groups ISG5, ISG6 and ISG4. If device C3 fails, relay 3CO operates and at its contacts enables device C1 to handle sub-groups ISG1, ISG2 and ISG5 and device C2 handles ISG3, ISG4 and ISG6.

Figure 2B:
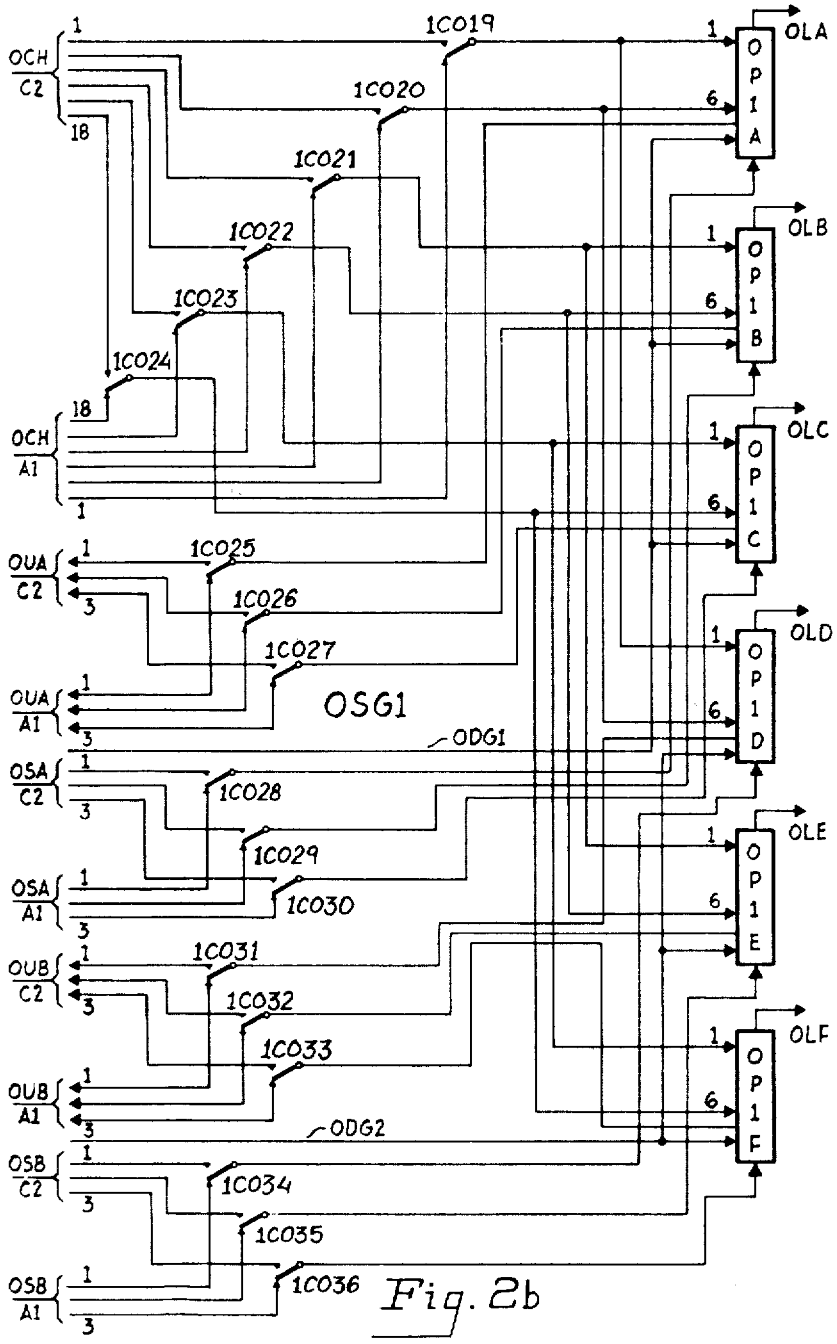

Similar arrangements are provided for the output units and these arrangements can be seen with reference to the skeletonised block diagram of one output sub-group in FIG. 2*b* where the changeover relay contacts are shown as 1CO19 to 1CO36. This diagram shows six output units OP1A to OP1F each serving individually one of outgoing lines or channels OLA–F. Each output unit is identical and is shown in logical diagram form in FIGS. 6 and 7 which will be considered in detail later.

It will be understood that while the changeover devices have been shown as electromagnetic relays 1CO, 2CO and 3CO, other changeover arrangements possibly electronic in character could equally well be used.

Basically each output unit consists of a six stage parallel register and a seven stage shift register. Each character to be transmitted to the output line or channel served by the output unit is passed in parallel form (five element bits plus a parity bit) from the controlling computer over a section of the outgoing line OCH in FIG. 2*b*. The five elements are then passed to the seven stage shift register the first and last stages of which are "filled" with internally generated start and stop elements. The character is then transmitted in serial form to the outgoing channel or lines such as OLA for output unit OP1A. Additional control equipment is provided to allow exclusive access to the particular output unit by the controlling data processing device and an indication of the "readiness" of the output unit to receive the next character.

When it is required to transmit a character to one of the outgoing lines or channels from the telegraph message switching centre, the output unit serving that required line or channel is selected by the controlling data processing device assuming that the output unit is capable of accepting the character.

Considering output unit OP1B in FIG. 2*b*, a signal will be produced on lead OUAA1/2 indicating the "readiness" of the output unit to receive the coded character information. This ready signal is produced when the six stage parallel register is empty i.e. after the transfer of the previous character from this register to the seven stage shift register. The ready signal is passed to the controlling data processing device, which is C1 in FIG. 1, and when this device is ready to output the next character in the message to be transmitted over the outgoing channel served by output unit OP1B, it uses the ready signal to allow the generation of the address allocated to output unit OP1B. This address, which may be of parallel multi-bit form, is passed over lead OSAA1/2 to select output unit OP1B. The reception of the address by the selected output unit terminates the production of the "ready" signal and prepares the output unit for the reception of the character to be transmitted.

The character is passed over leads OCHA1/7 to OCHA1/12 in the eighteen bit line from data processing device C1 in FIG. 1. The gating into the selected output unit OP1B is performed under the control of signal ODG1 generated by the controlling data processing device in response to the termination of the ready signal. In FIG. 2*b* only leads 1 and 6 are shown of the six leads to the parallel register in each output unit to simplify the presentation of the drawing. The data processing device output line OCHA1 consists of eighteen leads, and therefore, provision is made for the transfer of up to three sets of character indicating elements at a time. Hence if output units OP1A, OP1B and OP1C are all simultaneously producing signals on their ready leads (i.e. leads OUAA1/2, OUAA1/3) when the controlling data processing device commences its "output routine," selection signals will be produced on all three address leads OSAA1. When the gating signal ODG1 is produced simultaneous transfer of the three sets of character indicating elements will take place over the output line OCHA1 of the data processing device.

The output routine for each data processing device is organised in a "cyclic manner" although it need not be clock controlled and may be performed asynchronously. Each sub-group of output units is divided into equal sections of three output units per section. In the case of FIG. 2*b* two sections are shown (i.e. one section includes units OP1A, OP1B and OP1C while the other section includes output units OP1D, OP1E and OP1F). When the controlling data processing device enters its "output routine," the outgoing character elements for all those units which are "ready" in the one section are transferred over the data processing device output line OCHA1 (in FIG. 2*b*). Having completed this operation for one section of output units, the transfer of the character elements for the other section in the sub-group of output units is performed. Having completed the output transfer of the information for one sub-group, the output routine will now control the output transfer in a similar manner for the second sub-group, such as OSG2 in FIG. 1 for data processing device C1, and so on according to the number of sub-groups handled by the device.

Referring now back to FIG. 1, it will be seen that each output unit sub-group, such as OSG1, has two input paths. Each of these paths is in fact a multi-conductor arrangement consisting of the data processing device output line, the ready signal lead line, the address selection lead line and the outgoing data gating signal lead. Thus the path marked AO is formed by those leads marked OCHA1, OUAA1 OB1A1, OSAA1, ODG1 and ODG2 in FIG. 2*b*. The remaining leads (i.e. those which are disconnected when the change-over contacts shown in FIG. 2*b* are at rest) form the multi-conductor path CO in FIG. 1. Hence under normal conditions each data processing device in FIG. 1 handles two output unit subgroups. It will be noted that the middle portion of each data processing device in FIG. 1 has four output paths the additional paths being used only if one of the other data processing devices is removed for service.

Arrangements are provided such that if a fault occurs in one of the data processing devices, the paths from that faulty data processing device to the output unit subgroups it serves, are directed to the remaining data processing devices. If data processing device C1 fails, the fault detection equipment of device C1 causes the operation of the full set of switch contacts shown in FIG. 2*b* thus diverting the information and control lines for output unit sub-group OSG1 to the "third" output connection on device C2 over path CO. Output unit subgroup OSG2 will be similarly affected and will be served by device C3. Thus the effect of a faulty data processing device as far as the output of messages is concerned is simply to extend the duration of the output routine for the other data processing devices in the system.

Figure 3:
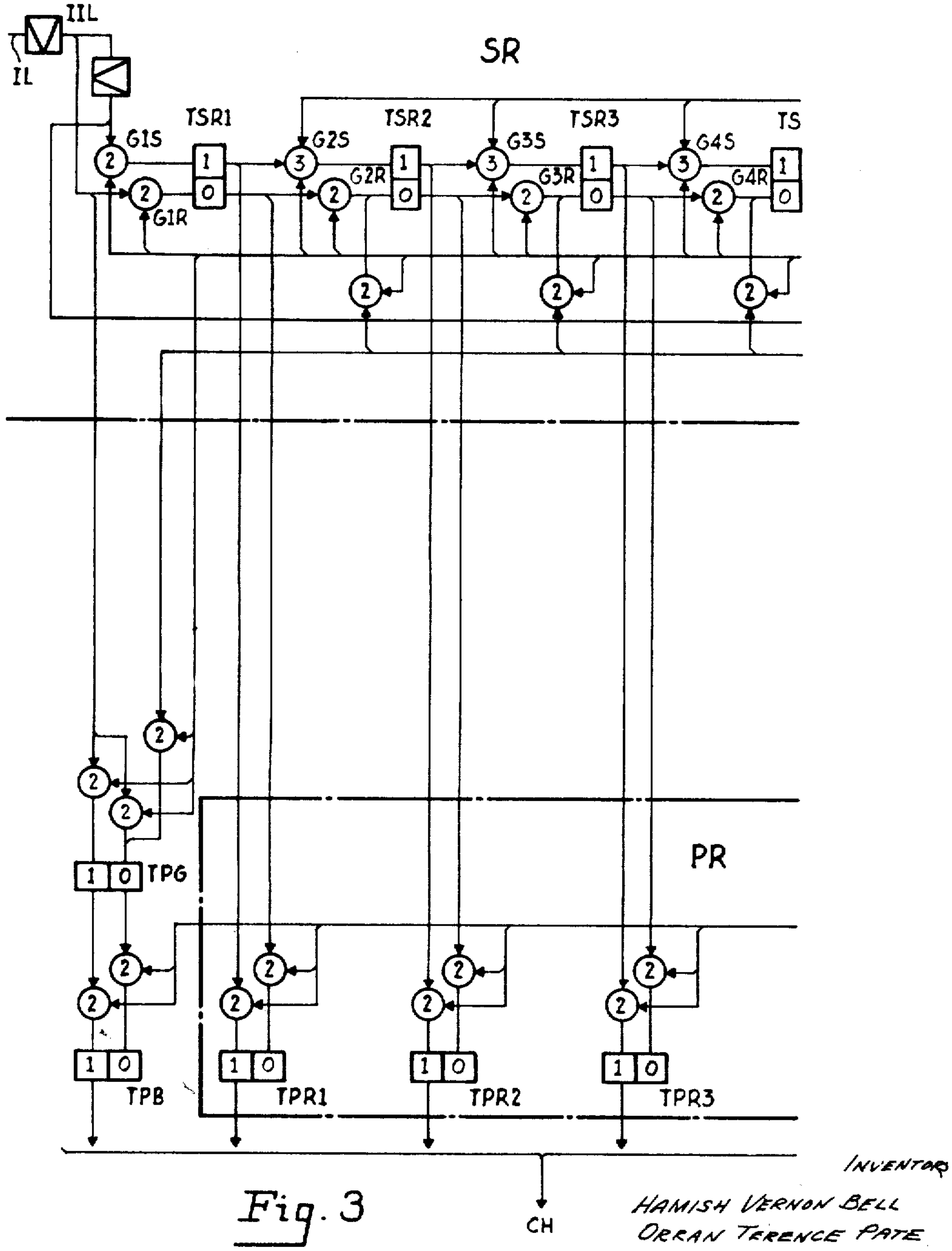
FIGS. 3 and 4 show the logical diagrams of an input unit.
Figure 4:
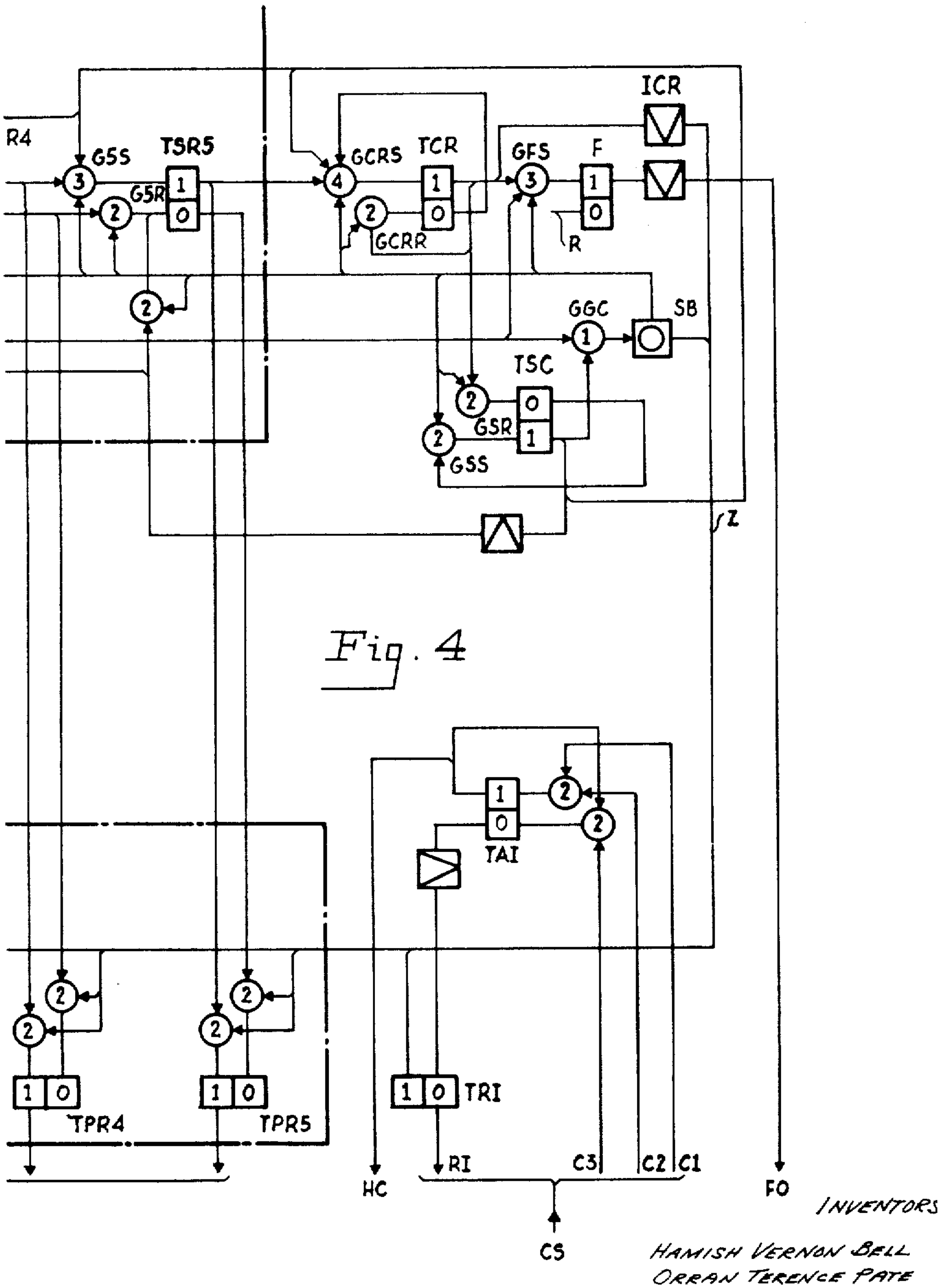

Consideration of the actual circuitry required for an input unit and an output will now be given and the circuitry required for the telegraph input unit will first be described with reference to FIGS. 3, 4 and 5. FIGS. 3 and 4 should be placed side-by-side with FIG. 3 on the left.

The telegraph input unit consists basically of a shift register SR and a parallel register PR. The incoming telegraph signals in the form of a serial element start-stop code are shifted into the shift register SR under the control of the strobe generator SB. The reception of the start condition on a toggle TCR at the end of the shift register allows the parallel transfer of the five-element code from the shift register SR to the parallel register PR. A parity generator and a sustained start signal detector are included for fault detection purposes. The read out of the five element code from the parallel register PR is performed under the control of the controlling computer such as C1 in FIG. 1.

Figure 5:
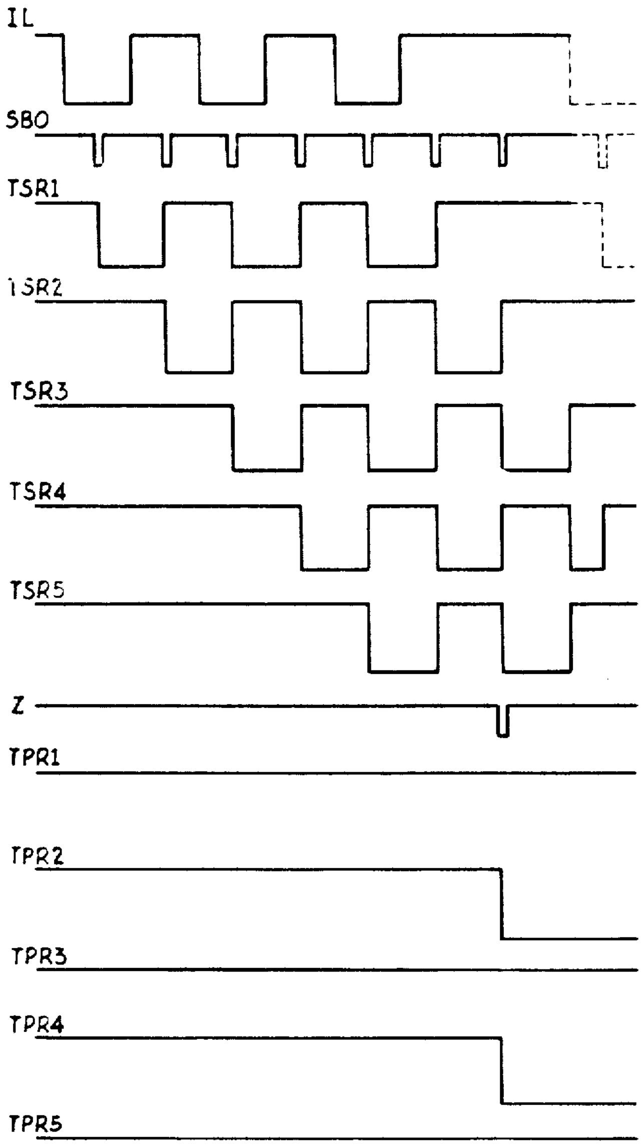
FIG. 5 shows various waveforms in connection with FIGS. 3 and 4.

FIG. 5 shows typical waveforms at various points in the circuit of FIGS. 3 and 4 and the waveform designated IL is an assumed waveform which will be used to describe the action of the telegraph input unit. The actual significance of the particular code chosen is not important as it is for explanatory purposes only, however, it corresponds to the code used to signify the letter Y in the "International Telegraph Alphabet No. 2" based on the Murray code and it takes the form of a space-mark-space-mark-space-mark-mark pattern where the first and last elements are the start and stop elements respectively. As far as the equipment in FIGS. 3 and 4 are concerned the mark signals are positive signals while the space signals are negative.

The incoming telegraph code on lead IL is applied to both sides of the first toggle TSR1 of the shift register SR, inversion taking place with respect to the reset or "0" state side input. The negative or space start signal is also applied, via negative OR gate GGC, to start the strobe generator SB. The strobe generator SB may conveniently be an emitter coupled multivibrator feeding a differentiating circuit and a pulse shaper circuit in series. The frequency of the multivibrator in the strobe generator is set to a particular value in accordance with the operating speed of the sending teleprinter. The strobe generator is arranged to generate its strobe pulses so that they occur at the nominal centre of the received input code elements.

The first strobe pulse produced by the strobe generator SB opens gate G1S allowing the setting of toggle TSR1 to take place. Toggle TSC is also set at this time as gate GGS is opened by the strobe pulse. Toggle TSC, when set frees the "set side" input gates of toggles TSR 2–5 ready for the reception of the subsequent elements of the code preceeded by the received start signal.

When the second strobe pulse is produced the first mark condition will be standing on lead IL and this condition together with the strobe pulse will open gate G1R causing the reset of toggle TSR1. At the same time the set condition of toggle TSR1 together with the strobe pulse and the set condition of toggle TSC allows the opening of gate G2S and the setting of toggle TSR2.

The start condition is shifted along the shift register under the control of the strobe pulses as shown in FIG. 5 waveforms TSR1–5 showing the output of each of the shift register toggles. The code elements follow the start code so that at the end of the fifth strobe pulse the start element is positioned in the final stage of the shift register SR and the fifth element of the code, a mark in the assumed case, will be the next condition received on lead IL.

When the sixth strobe pulse is produced toggle TCR sets as gate GCRS is opened. The setting of toggle TCR removes the inhibit from the strobe generator SB output on lead Z by switching the output of inverter ICR. The setting of toggle TCR also primes gate GSR ready for the resetting of toggle TSC.

At this stage, at the end of the sixth strobe pulse, the five elements of the received code are standing on toggles TSR1–5 as shown in the waveform diagram F. 5. Toggle TCR is storing the start element and toggle TSC is set.

The parity bit is also ready to be inserted into the parallel register PR at this time. Odd parity is provided so that toggle TPB will be set if an odd number of marks is received. The parity bit is generated by toggle TPG. This toggle is used as a binary divider and it monitors the output of the line inverter IIL.

It will be appreciated that, as far as the parallel register is concerned, the start and stop elements are redundant and are therefore ignored by this register.

When the seventh strobe pulse occurs toggle TSC is reset as gate GSR is opened. The resetting of toggle TSC causes the inhibiting of the strobe pulse generator SB as gate GGC is closed. The set condition of toggle TCR allows the seventh strobe pulse to be passed over lead Z to all the input gates of the parallel register PR toggles TPR1–5. The parallel register toggles will, therefore, assume the same conditions as those of the shift register toggles. This can be seen in the assumed case with reference to waveforms TPR1–5 in FIG. 5.

The strobe pulse on lead Z also gates the condition of the parity bit generator toggle onto toggle TPB. The ready toggle TRI is also set at this time directly by the Z lead strobe pulse. The set condition of the ready toggle is used to indicate to the control unit that a full character is ready for transfer to the coincidence detector.

The seventh strobe pulse is also instrumental in the shifting in of the stop element of the received code. It should be noted that the stop element takes the form of a mark and is one and a half elements as far as duration is concerned.

The registration of the received character is now complete and the reception of the next start element will restart the strobe generator SB. The strobe generator therefore hesitates under the control of toggle TSC for one half strobe pulse period. The first strobe pulse for the next character causes the reset of toggles TSR2–5 as shown in FIG. 5. The dotted lines on the waveforms of FIG. 5 show the effects on the waveforms of the next character.

From the above description it will be appreciated that the telegraph input unit does not require the removal of one character before the next character starts. Thus as long as the controlling data processing device "looks" at the telegraph input unit once within every character period no characters will be missed. The particular telegraph unit is selected from a number of such units by the controlling data processing device addressing the actual required telegraph input unit which causes the activation of address toggle TA1 by way of path CS. This path may be a multi-conductor path as represented by leads C1 and C2. The set state of toggle TA1 is used to produce a signal on lead HC to open the gates (not shown) which present the content of the parallel register PR, together with the parity bit, to the common highway to the controlling data processing device. The setting of toggle TA1 also causes the resetting of the ready toggle TR1 allowing this toggle to be set when the whole of the next character has been received.

Finally, the telegraph input unit is provided with a fault indicating toggle TF which is used to produce a fault condition if a continuous start condition is experienced on the line or a failure of the stop element is experienced. When the seventh strobe pulse appears, toggle TF will be set if the input lead IL is at this time at a "0" condition as gate GFS will be opened. The signal FO is passed to the controlling data processing device and an alarm is given and the contents of the parallel register are ignored.

Figure 6:
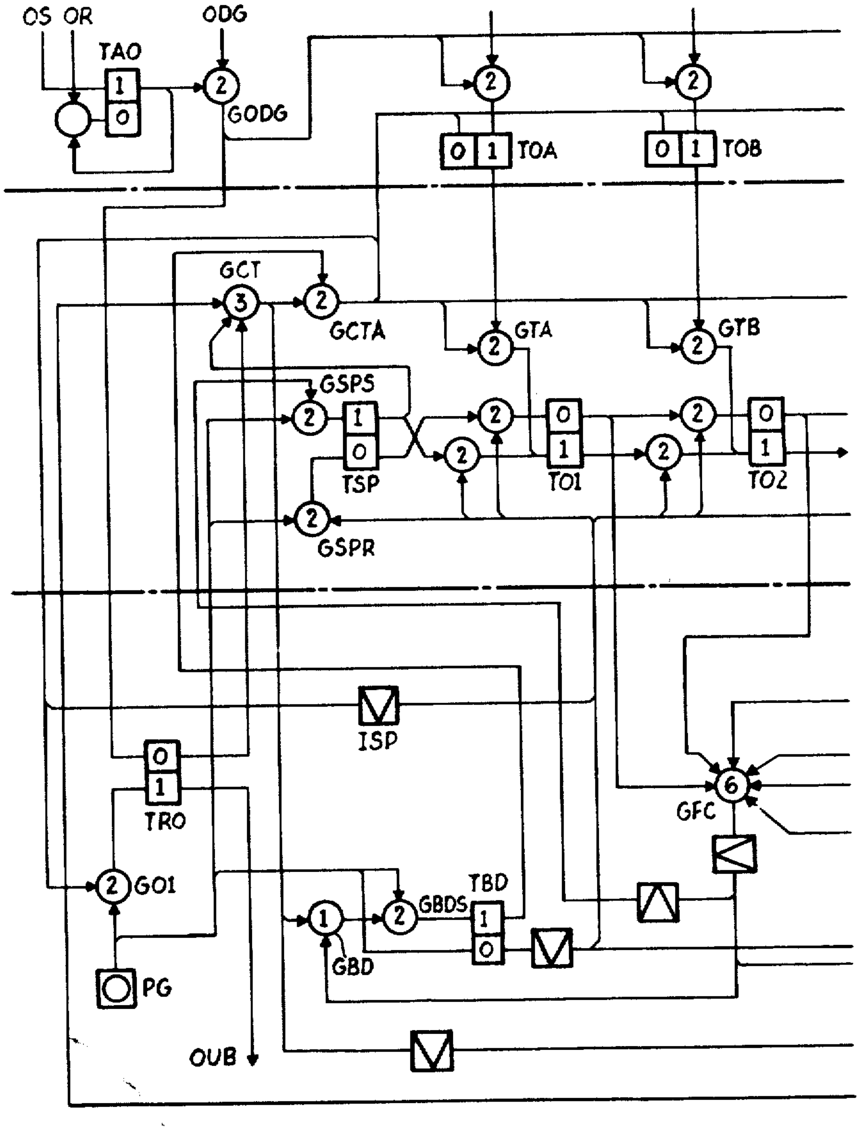
Figure 7:
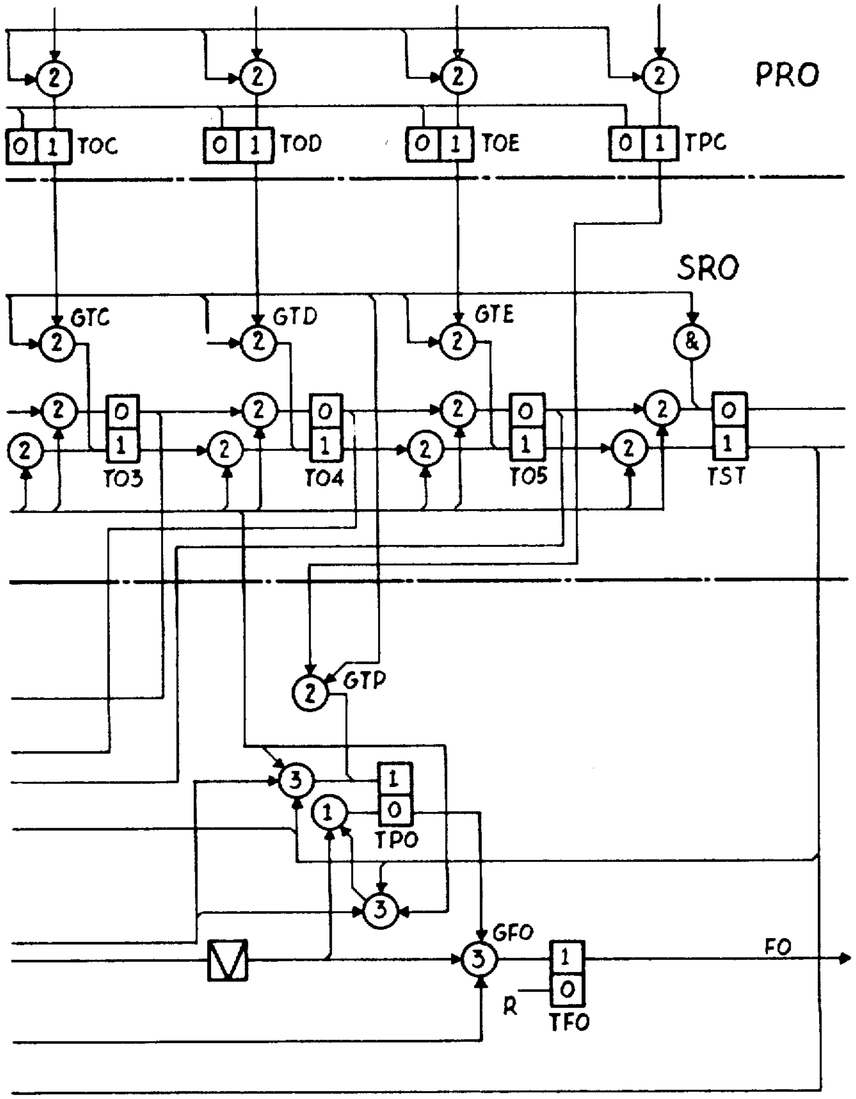

The operation of the telegraph output unit will now be considered with reference to FIGS. 6 and 7, which should be placed side by side with FIG. 6 on the right.

The telegraph output unit is divided into three sections dealing with (i) the reception of the character to be transmitted (ii) the transmission of the character and (iii) the control of the first two sections. Sections (i) and (ii) are shown in FIGS. 6 and 7 as PRO and SRO. Section PRO consists of a parallel register for the reception of the six bit code of the character to be transmitted while section SRO consists of a seven bit shift register. The six bit character from the controlling data processing device is passed over a common highway to the selected telegraph output unit. The required telegraph output unit is selected by the operation of the relevant address toggle TAO over lead OS from the controlling data processing device. Lead OS may in fact be one of a number of leads. When the required telegraph output unit has been selected a signal is generated on lead ODG to allow the gating in to the parallel register PRO of the character data on the common line.

Toggles TOA to TOE will, therefore be set to the condition presented on the common line from the controlling data processing device. For ease of presentation it will be assumed that the actual character required for transmission is the same as that used to describe the section of the telegraph input unit (i.e. letter Y in the "International Telegraph Alphabet No. 2"). Thus toggles TOA/TOC and TOE will be set and toggles TOB and TOD will be reset and the parity bit toggle TPC will also be reset.

It will be appreciated that the transmitted character must include start and stop elements and these elements are included automatically in the shift register. Toggle TST will initially be reset to provide the start "space" signal and toggle TSP will initially be set to provide the "mark" stop signal.

The generation of the mark and space signals used to form the required character is performed under the control of a pulse generator PG and a binary divider toggle TBD. The frequency of the pulse generator PG, which is of similar construction to that of the strobe generator of the telegraph input unit but continuously running, is arranged to be twice the required frequency. The reason for this will become apparent later.

The opening of gate GODG, as well as "gating in" the character, causes the resetting of the ready toggle TRO. The reset state of this toggle allows gate GCT to be opened, as toggle TST will be set from the last character and toggle TSP has been set.

The opening of gate GCT allows the next strobe pulse to set toggle TBD, as gates GBD and GBDS are opened. The setting of toggle TBD allows the opening of gate GCTA which via inverter ISP inhibits the shifting action of toggle TBD and allows the gating of the character in the parallel register PRO in to the shift register SRO which is also reset at this time by the opening of gate GTCA. The ready toggle TRO is set by the opening of gate GO1 to indicate that the telegraph output unit parallel register is now free.

In the transfer from the parallel register PRO to the shift register SRO, gates GTB and GTD will not be opened and gates GTA, GTC, GTE and GTP will be opened. Hence, the shift register will read as follows:

| | |
|---|---|
| TSP | 0 |
| TO1 | 1 |
| TO2 | 0 |
| TO3 | 1 |
| TO4 | 0 |
| TO5 | 1 |
| TST | 0 |

Toggle TST is reset by gate GCTA.

The next strobe pulse resets toggle TBD having no effect on the circuit. It should be noted that the setting of toggle TRO closes gate GCT thus removing the shift control inhibit by switching inverter ISP.

The next strobe pulse (i.e. the third as far as the description is concerned so far) causes the setting of toggle TBD and the consequent production of a shift pulse to the shift register. Toggle TSP is reset as gate GSPR is opened and the complete character given a one bit shift right. The output of toggle TST is used to control a telegraph relay or the like. The shift register will now read as follows:

| | |
|---|---|
| TSP | 0 |
| TO1 | 1 |
| TO2 | 1 |
| TO3 | 0 |
| TO4 | 1 |
| TO5 | 0 |
| TST | 1 |

The telegraph output unit continues to respond effectively to every other strobe pulse until the stop element reaches toggle TST.

The intermediate steps of the shift register will be as follows:

| TSP | TO1 | TO2 | TO3 | TO4 | TO5 | TST |
|---|---|---|---|---|---|---|
| 0 | 0 | 1 | 1 | 0 | 1 | 0 |
| 0 | 0 | 0 | 1 | 1 | 0 | 1 |
| 0 | 0 | 0 | 0 | 1 | 1 | 0 |
| 0 | 0 | 0 | 0 | 0 | 1 | 1 |

When the stop element reaches toggle TST gate GFC is opened. The opening of this gate causes the gate GBD to be inhibited, holding toggle TBD in the set state. The opening of gate GFC also causes the setting of toggle TSP at the next strobe pulse by opening gate GSPS. The divider toggle TBD will not be reset by this strobe pulse due to the inhibit OR gate GBD.

The setting of toggle TSP and the set condition of toggle TST opens gate GCT causing gate GBD to be opened again. This allows toggle TBD to set and cause a shift operation to be performed on the shift register. It will be appreciated that the shift operation has been delayed by one pulse from the strobe generator, thus making the stop element one and a half times longer than a normal character element.

It will also be appreciated that the parallel register may be filled asynchronously from the controlling data processing device any time after the transfer of the current character from that register to the shift register. The opening of gate GCT and the set condition of toggle TBD, for the final shift, allows the next character to be transferred into the shift register. The address toggle is controlled from the data processing device by leads OS and OR.

A parity check is performed on the outgoing information and if the parity is correct toggle TPO should be set at the end of the transmission. If the parity bit was not correct toggle TPO will be reset at the end of the character transmission and gate GFO will be opened when gate GCT is opened and toggle TBD is set for the last shift pulse. The opening of this gate causes the setting of toggle TFO and the generation of a fault signal.

Figure 8:
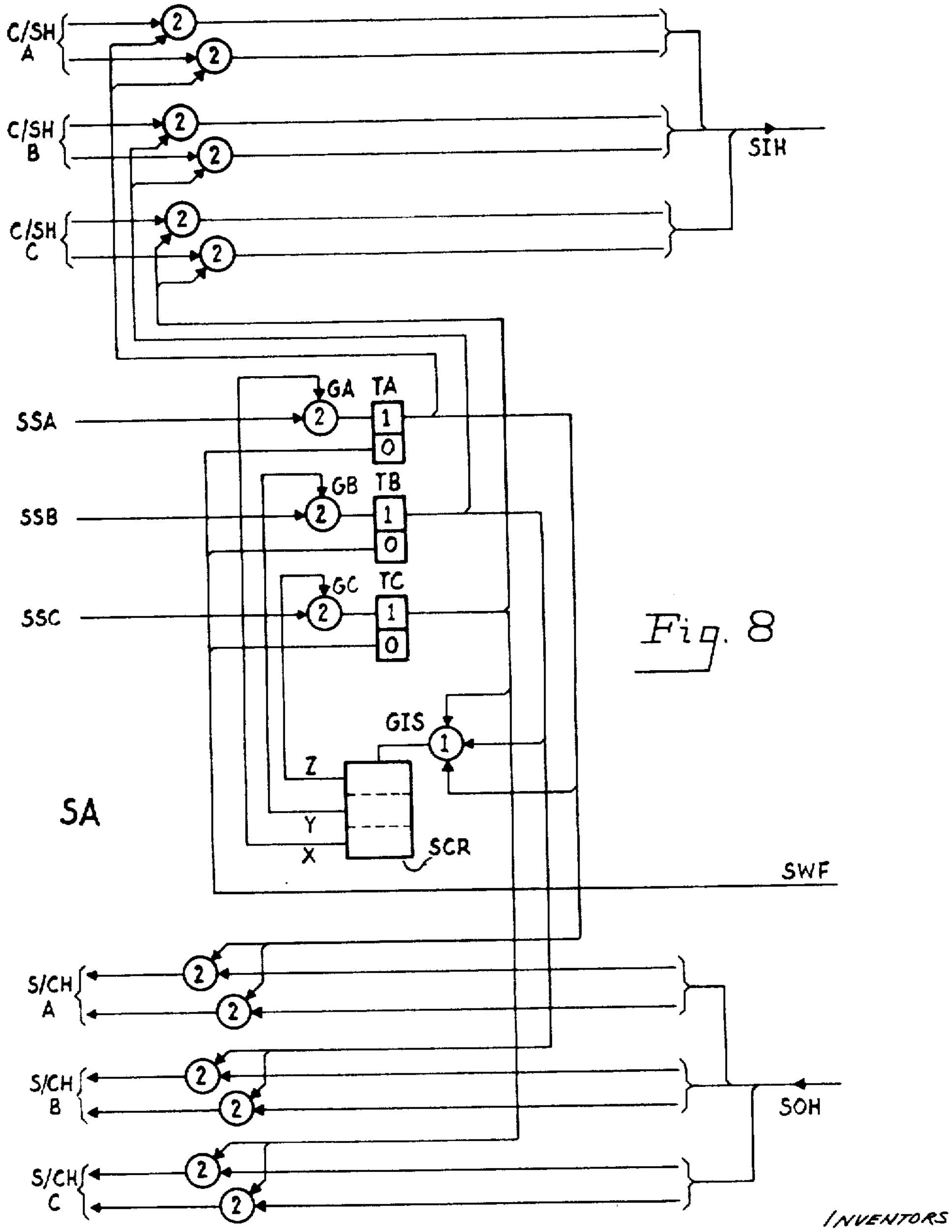
FIG. 8 shows the store access logical diagram.

Consideration will now be given, with reference to FIGS. 1 and 8, to the over-all functioning of one embodiment of the invention in the form of a telegraph message switching system.

When it is required to send a telegraph message, a teleprinter connected to the switching centre will start transmitting telegraph characters in serial form over the line or channel to the associated input unit. The line input unit produces a ready signal when a complete character has been received. Obviously arrangements must be provided to ensure that a transmitted telegraph character is not missed. This is ensured by running the data processing devices C1, C2 and C3 under the control of clock pulses applied over leads CK1, CK2 and CK3 respectively.

The clock control signals CK1, CK2 and CK3 may simply be such that each data processing device is controlled in step and is arranged to complete a full cycle of operations (i.e. input of data, output of data and message and data processing or switching) in a 150 millisecond period. Alternatively the operations may be performed asynchronously and the information provided by leads CK1, CK2 and CK3 could be the output of a real time digital time clock. In the latter case each time the data processing device entered the first of its routines (i.e. the input routine) a note is made of the actual time of entry into this routine and a note is also made of the time at which the full cycle of operations is to be completed (i.e. 150 milliseconds after the start of the routine). Arrangements are provided to cause a programme interrupt at the end of the time allocated to a full cycle causing entry into the input routine once more and consequently re-starting the full cycle of operations.

The latter arrangements employing the programme interrupt facilities provides a very efficient method of using the operating time of the data processing device, as it ensures that at all times the data processing device is doing useful work. If, in periods of low traffic, the data processing device completes its full cycle of operations before the programme interrupt occurs, the device simply controls its own re-entry into the input routine noting the time of entry and the time at which the programme interrupt must be performed. In periods of high traffic, the times required for the input and output routines will be comparatively large, however, by calculating, using actual traffic figures, the number of input and output units served by each data processing device, it can be arranged that all the "calling" units are served by the data processing device within one character period. Therefore the period between two programme interrupts should not be greater than one character period. In this latter case the time allocated for processing in each cycle is somewhat limited, however, as periods of high traffic are only a small part of the full operating time of a telegraph message switching centre, little if any effect will be felt.

The incoming characters of the transmitted telegraph message are transferred one at a time into the store of the controlling data processing device where they are built up into blocks of characters. At the commencement of a telegraph message a particular "start of message" code is inserted by the transmitting telegraph station and this code is checked by the controlling data processing device. When the "start of message" code is recognised the controlling data processing device makes a demand to the message store ST via the access switch SA for a section of store addresses which are free and can be used to accept the incoming telegraph message. The controlling data processing device will pass the first block of data into the first address of the newly allocated section of the store. In the case of a forty-eight bit word store each address will store eight characters (five elements per character plus parity) thus a block in this case consists of eight characters. At this stage the controlling data processing device, in the processing routine following the input routine in which the "start of message" code was detected, generates the channel identity and message sequence number for the channel from which this code has been received. The fact that a message has been initiated for storage in the allocated section of the message store is noted in a message state store also in the store ST. When, at some subsequent time in the reception of the information forming the "envelope" of the telegraph message, the channel identity number and the telegraph message sequence number are transmitted by the originating telegraph station, a comparison is made between numbers generated by the data processing device and the received numbers. An alarm will be initiated if these numbers do not agree.

The cycling of the full operation cycle of the data processing device continues with the sequential reception and storage of the telegraph coded characters in the input routines with the attendant transfer of blocks of characters to the next address in the seized section of message storage until the destination code and priority indicator has been received. The reception of these items of information together with the store location at which this information is to be found in the message store is written into the message state store for use by the controlling data processing device or any of the other data processing devices at a later date to perform the "switching" operation. This will be described below.

The controlling data processing device continues to receive the telegraph coded characters in succeeding input routines up-dating the message store until the "end of message" code is received. An indication that the complete message has been transferred from the stores of the data processing devices into the message store is placed in the message state store. If the message received requires more storage space than was originally allocated an additional section is seized and the first address of this extra section is written into one of the latter locations of the originally seized section. The latter locations of each section of storage and used for administration purposes. If no "end of message" code is received an "inserted code" is generated by the controlling data processing device after a time lapse.

Once the controlling data processing device has passed the required message destination information into the message store and the address of this has been placed in the message state store, a free data processing device, when in its "processing routine," reads the destination and priority indicator information and puts the first address of the section of the storage in the message store which has been allocated to the message, into the "Queue store." This store is arranged in sections, one for each outgoing line or channel on the switching centre. Thus under each outgoing line or channel heading, a number of "Queues" of the first message store address of messages can be formed in priority/time of arrival order for transmission outwards over that line or channel. This operation constitutes the switching operation of the centre. The allocated condition of the message is noted in the message state store.

When an outgoing line or channel becomes free, the data processing device looks at the "Queue" for that line and reads out the first address of the section of storage in the message store allocated to the highest priority message awaiting transmission over that line. The 1st address is removed from the "Queue" store and an indicated is put in the message state store for that particular message to show that the re-transmission of the message is in progress. The data processing device now controls the transfer of a block at a time from the message store (i.e. read out of the contents of one store location at a time from the section of the message store holding the message) to its own store. The data processing device now feeds a character at a time to the output unit serving the required outgoing line in its output routine. The data processing device controls the transfer of information from the message store to the output line until the full message has been re-transmitted. When this operation is complete the section or sections of message store are freed for use by subsequent messages.

The general operations of the data processing devices as detailed above follow a strict cycle of operations which is conveniently controlled by a suitably oriented programme.

Consideration will now be given to FIGS. 9*a* and 9*b* which should be placed side by side with FIG. 9*a* on the left. These figures show a flow diagram of part of the programme which is used to control the computers C1-

C3 of FIG. 1. FIG. 9*a* shows the flow diagram of the input routine while FIG. 9*b* shows the output routine and a routing routine which is one of a number of processing routines.

*Input routine*

As mentioned previously an input line or channel terminates at an input unit. The character bits are received in serial form, and are staticised in a seral register SR (FIGS. 3 and 4) in the input unit. When the character is complete a parity bit is added and the contents of the serial register SR are transferred automatically to a parallel register PR (FIGS. 3 and 4) also contained in the input unit. When the transfer is made, a ready bit (toggle TRI in FIG. 4) is automatically set. The ready bit signifies that the character is ready to be read by the controlling computer. In the meantime, the next character may be assembling in the serial register.

The computer commences the input routine by scanning all the ready bits corresponding to the computers input lines. The ready bits are transferred into a register in the arithmetic unit of the computer and a test for zero contents on that register is performed. This operation allows the computer to see if any bit is marked, as a result of this operation will only be all zeros if no ready bits were present. This operation is covered in the flow diagram by the question "Is any data ready." If no ready bits are found marked, the computer proceeds with the next part of the cycle (i.e. the output routine). If, however, ready bits are marked a mask merging technique is used to extract the first marked ready bit and to form the address of the input unit. The input unit in question is now addressed and the character read-in. The ready bit is automatically reset as the read-in operation is performed. The input routine now handles the read-in character, assembling it into its own store along with other characters previously received as part of the same message.

After the assembly operation a test is made to see if the start of message (SOM) code is completed by the new character. If it is, a block of storage in the common message store ST is allocated and a start of message indication (SOM IND) is placed in the message state store MSS. The storage block allocation operation can be performed with reference to the message state store MSS as this store consists of a location for each block of storage in the common message store ST and, therefore, if a particular location in the message state store MSS is empty it indicates that the corresponding block of storage in the message store ST is also empty.

If the recently read-in character is part of a message subsequent to the start of message code a test is made first to see if the incoming character completes a block of characters which may subsequently in the processing routine be transferred to the common message store ST. A test is also made to see if the end of message code (EOM) has been received although a character block has not yet been formed. It will be noted with reference to FIG. 9*a* that a return to the "input unit scan" part of the routine is made after the handling of each character in accordance with the circumstances encountered. Hence the programme sequentially handles the reception of the incoming telegraph message characters. When all the originally marked ready bits have been dealt with the computer goes on to perform the output routine which is shown on the left of FIG. 9*b*.

*Output routine*

As mentioned previously each output line is fed by an output unit which contains a parallel register (PRO in FIGS. 6 and 7) and a serial register (SRO in FIGS. 6 and 7). When an output unit is ready to receive a character for outward transmission from the centre a ready bit toggle TRO is set allowing a character to be fed from the computer into the parallel register. When the serial register is empty, indicating that the previous character has been transmitted, the new character is automatically transferred from the parallel register to the serial register and the ready bit is reset.

The computer commences the output routine by looking at its own store to see if there are any characters to be transmitted. If there is not the computer proceeds with the next part of the cycle (i.e. the processing routine). If there are characters to be transmitted the computer now looks at the ready bits, selecting one in a similar manner to that shown for the input ready bit selection. The computer passes the characters to the output units in turn.

A test is also made in this routine to see if the transmission of a message has been completed. If this test is satisfied the message is marked for transfer to a magnetic tape file. This operation is performed in one of the processing routines. When a message has been completed reference is made to the Q store for the address of the first block of storage for the next message for transmission over that output line. The Q store is also moved up one place cancelling the head of Queue which has been transmitted.

*Processing routine*

The system actually includes a number of processing routines used in the administration of the switching centre, entry into which is under the control of an executive programme (not shown), however only one of these routines need be considered as far as the invention is concerned. This processing routine is actually entered from the input routine when the test for the end of message code (EOM) has been satisfied. A check on the station and channel codes together with the channel serial number is effected at this point. The programme then enters the routing routine.

*Routing routine*

This routine is concerned with reading the routing indicator (i.e. destination code) and defining which output line or channel the message is to be transmitted over. A test for alternate routing is also made in the case of the normal route being out of service. The routine then organises the insertion of the first address of the block of storage allocated to the message into the Q store for the particular line in accordance with the indicated priority level of the message. The completion of the routing routine returns the programme to the input routine.

*Other processing routines*

Each of the processing operations is organised as a single process selected under the control of an executive programme. Examples of single process operations are "write into common store," "read from common store," "routine system," "write into file," "read from file" and so on. All the single processes are arranged to having running times of less than half the character reception time and are only entered if sufficient time is available before an input routine is to be performed.

*Clock interrupt points*

It was mentioned previously that each computer is under the control of an interrupt arrangement which allows the input routine to be re-entered if the time lapsing between the last scanning of the input lines approaches the time taken for the reception of a character. The points at which the interrupts become effective as far as the programmes shown in FIGS. 9*a* and 9*b* are concerned are shown as X and the dotted lines show the re-entry paths.

Consideration will now be given in more detail to the various stores mentioned and their functions.

*Message state store MSS*

This store is provided within the common store ST and it consists of one location for each block of storage in the common store. Information is written into a location in this store to define the state of each message received by the system. For example, a location in the message state store will be empty when the corresponding block of storage in the common store is also empty. Discrete codes are written into the message state stores when the start of message code is received, when the switching operation has been performed, when the end of message code has been received and when the complete message has been transmitted. Reference to this store at any time, therefore, indicates the stage reached in the handling of any message and the number of storage blocks in the common store ST which are available for allocation.

*Queue store QS*

This store is provided within the common store ST and it consists of one section for each outgoing line from the switching exchange. Each section consists of a number of locations and the first address of a block of storage in the common store allocated to a telegraph message to be transmitted over the corresponding outgoing line is written-in in priority time of arrival order. Thus each section of the queue store effectively holds an indication of all the messages stored within the switching centre which are waiting to be transmitted over each output line. The up-dating of the queue store is performed in the "routing routine."

*Computer store*

Each computer has its own working store which is organised to have two discrete sections, one for assembling the received characters into character blocks and the other for storing character blocks ready for transmission over an associated output line. Hence the input section has an individual portion for each input line served by that computer and the output section has an individual portion for each output line served by that computer. Associated with each portion of both sections is a "tag" which is set when (a) a complete character block has been assembled (in the case of the input section) or (b) when the last character of a character block has been passed to the output unit (in the case of the output section). These tags can now be used to indicate which character blocks are to be involved when computer-store to common-store or common-store to computer-store transfers are called for in the processing routine.

*Message store ST*

From the above description it is obvious that each data processing device requires access to the message store, shown as ST in FIG. 1 and in fact to the same areas of storage. Hence effectively a communication system between the data processing devices is required. FIG. 8 shows the equipment required in the store access equipment, shown as SA in FIG. 1, to allow each data processing device access to the store. The access equipment SA consists of a store output highway gating field for each data processing device, together with an allocation circuit.

The store is provided with two lines one being the input line SIH which is a parallel path for input data, address information and control signals to the store, such as "read," "write" and so on. The other line, the output line SOH, also consists of a parallel path for output data and control signals from the store, such as "read finish," "write finish" and so on. The allocation circuit consists of three data-processing-device-allocation toggles TA, TB and TC which are cycled under the control of scanner SCR. Scanner SCR may conveniently be a three stage counter stepped by a series of pulses. The "store select" signals SSA, SSB and SSC from each data processing device are gated by the outputs from the scanner SCR.

When a data processing device requires access to the store it generates a "store select" signal. Assuming data processing device C1 requires access to the message store, signal SSA will be activated. When the scanner produces an output on lead X gate GA will be opened and toggle TA will set. The setting of toggle TA allows the interconnection of the input and output lines C/SHA and S/CHA and for data processing device C1 and the store input and output highways SIH and SOH. The setting of toggle TA also inhibits the scanning operation of scanner SCR by opening OR gate GIS. The required store cycle (i.e. read, read/re-write or write) is then performed. When the operation is complete the store write finish signal on lead SWF is produced and toggle TA will be reset allowing the scanner SCR to "step-on" and another allocation to take place if and when required.

The above description has been of one embodiment only and is intended to be in no way limiting to the invention. Alternative embodiments of the invention will be appreciated by those skilled in the art. For example, a second embodiment of the invention may be formed by introducing a further data processing device which handles exclusively the transfer of the blocks of telegraph coded characters to or from the input/output line or channel unit controlling data processing devices. This allows less processing work to be performed by the line channel controlling devices and therefore allows more units to be served by these devices. In these cases a transfer store is provided and is used to store each block of data and the additional data processing device, which operates in accordance with a separate and non-associated programme, controls the transfer of the information to and from the transfer store to a message store.

We claim:

1. An automatic data processing system comprising a plurality of data processing devices each obeying substantially identical programmes not necessarily in synchronism, a plurality of input/output lines or channels divided into a plurality of equal groups, the number of groups being equal in number to the number of data processing devices whereby each of said data processing devices under "no fault" conditions serves exclusively one group of input/output lines or channels and means effective under detected fault conditions in one of said data processing devices for automatically allocating by exclusive connections the input/output lines served by the faulty device equally among the remaining non-faulty devices.

2. An automatic data processing system as claimed in claim 1, and including a storage device and means for individually and exclusively associating any one of said data processing devices with said storage devices, said storage device serving to store the full information received from an input line associated with said one data processing device.

3. An automatic data processing system as claimed in claim 2, and including an input unit associated with an input line, said input unit including means for converting received character elements from serial to parallel form and storage arrangements for storing one complete character.

4. An automatic data processing system as claimed in claim 3 comprising a multi-conductor output for each of said input units, a first multi-conductor line, a second multi-conductor line and changeover means, the multi-conductor output being connected over said changeover means in the non-activated condition to said first multi-conductor line extending to one of said data processing devices under no-fault conditions in said one data processing device and being connected under fault conditions in said one data processing device over said changeover means in the activated condition to said second multi-conductor line extending to the appropriate one of said remaining data processing devices.

5. A telegraph message switching centre comprising a plurality of groups of incoming lines, a plurality of input units each one associated with one of said incoming lines, a plurality of groups of outgoing lines, a plurality of output units each one associated with one of said outgoing lines, a plurality of data processing devices each one accessible to one group of input units and giving access to one group of output units, and individual storage device for each of said data processing devices, a storage device common to all said data processing devices and to which each of said data processing devices has access, said data processing devices each being programmed to perform identical successive cycles of operations, each cycle consisting of an input routine, an output routine and a processing routine, means in each input unit for registering a telegraph character forming part of a telegraph message, each data processing device during an input routine receiving telegraph characters registered one at a time on said associated input units and in its individual storage device to assemble such characters into blocks of characters associated with particular messages, each data processing device during an output routine transferring from its individual storage device characters one at a time from blocks of characters forming a telegraph message which is to be transmitted over an output line served by said data processing device and a data processing device during a processing routine defining the output unit associated with the outgoing line over which a telegraph message is to be transmitted in accordance with information contained within said message, said data processing device in said processing routine also transferring assembled blocks of characters from its individual storage device to said common storage device and transferring the next block of characters from said common storage device to its individual storage device when the previous block of characters has been transmitted over an output line, said data processing devices each having associated therewith a programme interrupt facility which is effective a predetermined period after the initiation of said input routine of one cycle of operations to initiate the input routine of the next cycle of operations irrespective of the stage reached in said one cycle of operations, said predetermined period being not greater than the time occupied by the reception of one telegraph character.

6. A telegraph switching centre as claimed in claim 5, and including a further storage device associated with said common store, said further storage device having a discrete location for each section of a plurality of sections into which said common storage device is divided each section of said common storage device being capable of storing one complete telegraph message, said further storage device being common to all said data processing devices and being used to store in the corresponding section of the common storage device coded signals indicative of the state of the processing of the telegraph message.

7. A telegraph switching centre as claimed in claim 5 and including an additional storage device provided in common to all said data processing devices, said additional storage device having a discrete section for each one of said output units and being arranged to store the first address of sections in said common storage device in which sections are stored messages which are to be transmitted over the output line associated with one output unit.

References Cited

UNITED STATES PATENTS

| | | | |
|---|---|---|---|
| Re. 26,171 | 3/1967 | Falkoff | 340—172.5 |
| 3,323,109 | 5/1967 | Hecht et al. | 340—172.5 |
| 3,312,951 | 4/1967 | Hertz | 340—172.5 |
| 3,303,474 | 2/1967 | Moore et al. | 340—172.5 |
| 3,263,219 | 7/1966 | Brun et al. | 340—172.5 |
| 3,248,476 | 4/1966 | Cilino | 178—2 |
| 3,214,739 | 10/1965 | Gountanis et al. | 340—172.5 |

ROBERT C. BAILEY, *Primary Examiner.*

GARETH D. SHAW, *Assistant Examiner.*